United States Patent [19]

Takei et al.

[11] Patent Number: 5,010,352

[45] Date of Patent: Apr. 23, 1991

[54] THERMAL TRANSFER INK PRINTING APPARATUS

[75] Inventors: Katsumori Takei; Hitoshi Fukushima; Kohei Iwamoto; Hiroto Nakamura, all of Nagano, Japan

[73] Assignee: Seiko Epson Corporation, Tokyo, Japan

[21] Appl. No.: 467,114

[22] Filed: Jan. 19, 1990

Related U.S. Application Data

[62] Division of Ser. No. 104,139, Oct. 5, 1987, Pat. No. 4,914,079.

[30] Foreign Application Priority Data

Oct. 6, 1986 [JP] Japan ................................ 61-237482

[51] Int. Cl.$^5$ ........................ G01D 15/10; B41J 2/315

[52] U.S. Cl. ................................ 346/76 PH; 400/120

[58] Field of Search .................... 346/76 PH; 400/120

[56] References Cited

U.S. PATENT DOCUMENTS 4,704,615 11/1987 Tanaka .......................... 346/76 PH
4,732,815 3/1988 Mizobuchi et al. ................ 428/484
4,744,685 5/1988 Mecke et al. ...................... 400/120
4,883,715 11/1989 Kuge et al. ........................ 219/216

FOREIGN PATENT DOCUMENTS 0071585 5/1980 Japan .
0286194 12/1986 Japan .
0077987 4/1987 Japan .
0108089 5/1987 Japan .

*Primary Examiner*—Benjamin R. Fuller
*Assistant Examiner*—Huan Tran
*Attorney, Agent, or Firm*—Blum Kaplan

[57] ABSTRACT

A thermal transfer ink medium including a heat resistant support layer having an ink layer thereon and an ink transfer layer or film on the ink layer is provided. Printing is performed by applying thermal energy to selected portions of the thermal transfer ink medium in accordance with image signals. The ink transfer layer and selected portions of the ink layer are transferred to a transfer medium by selective activation of the ink layer. By providing the ink transfer layer, the ink is maintained as a cohesive body and transfer is not affected by the surface roughness of the transfer medium.

6 Claims, 8 Drawing Sheets

FIG. 1
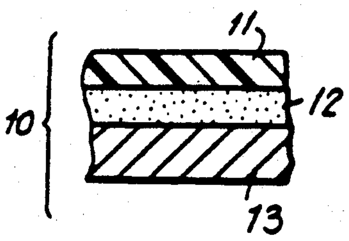
FIG. 2
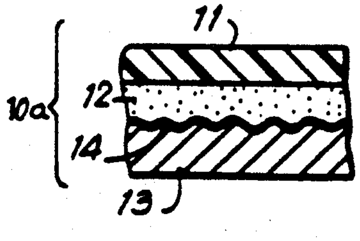
FIG. 3
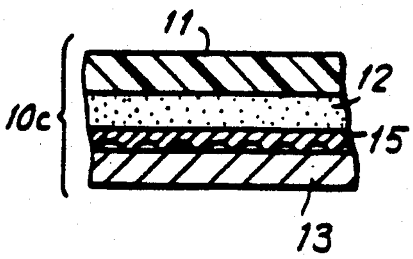
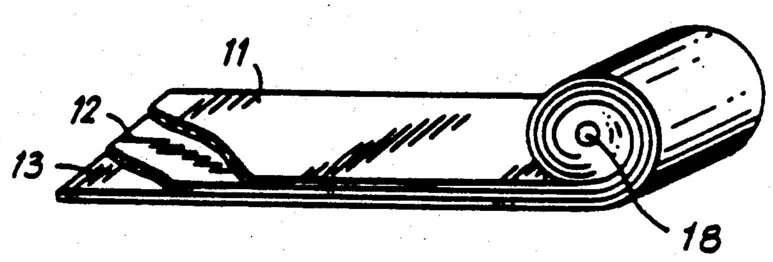
FIG. 4
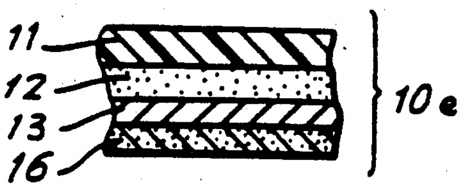
FIG. 5

FIG. 9A
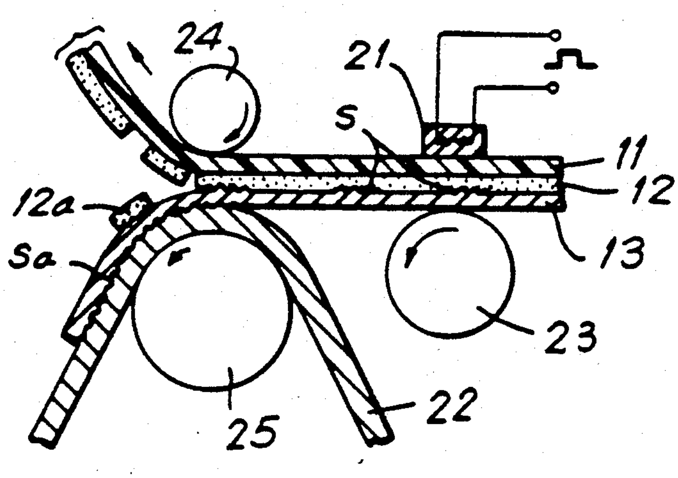
FIG. 9B
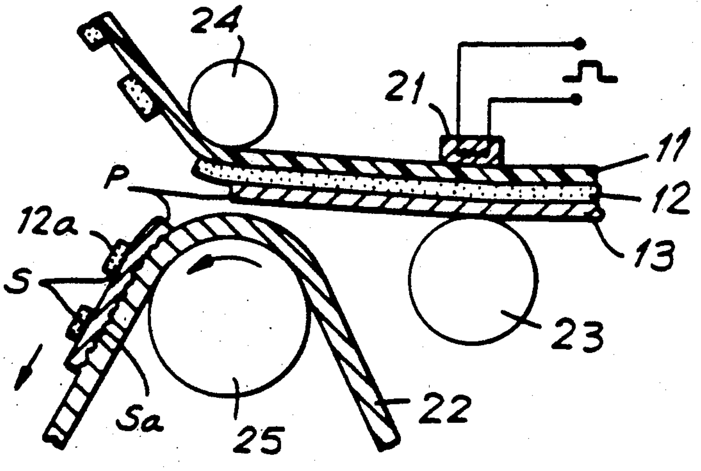
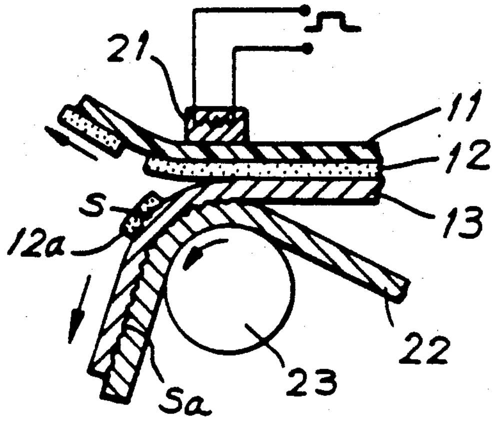
FIG. 10

FIG. 12
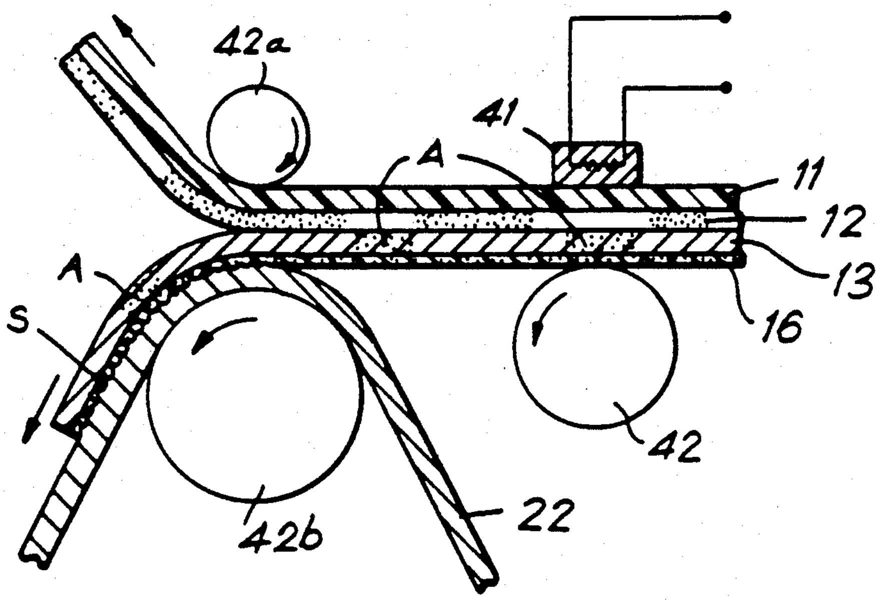
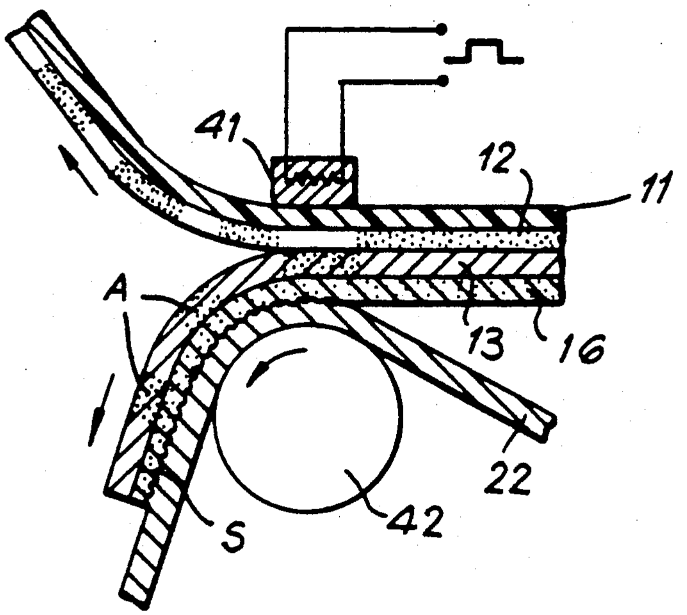
FIG. 13

FIG. 14A
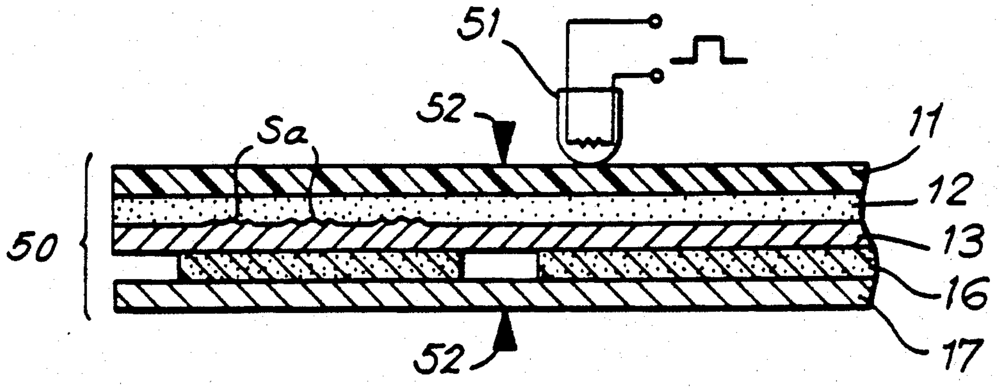
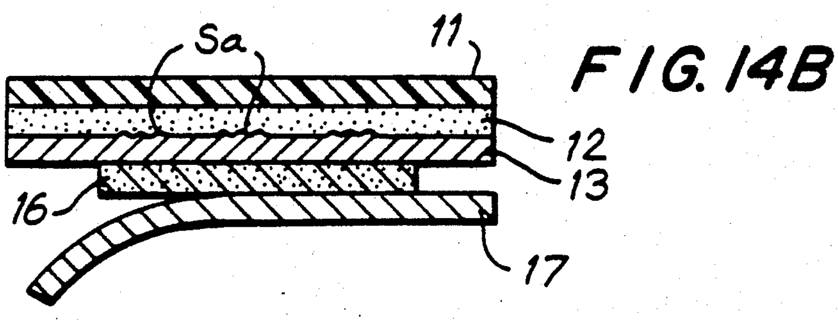
FIG. 14B
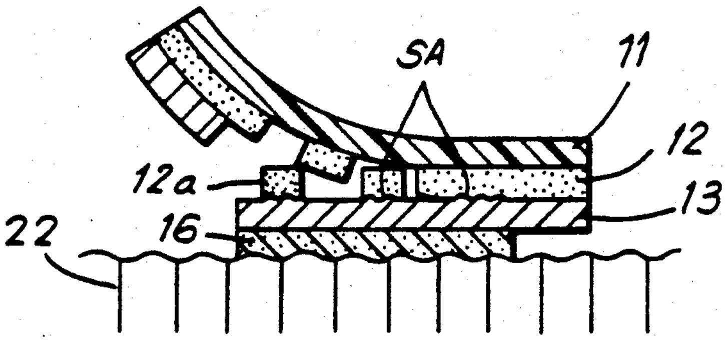
FIG. 14C

FIG. 15
PRIOR ART
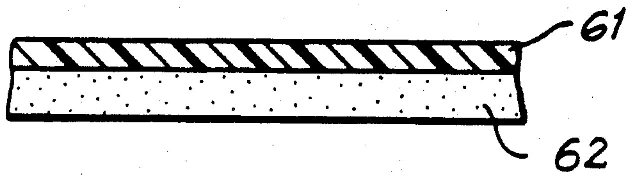
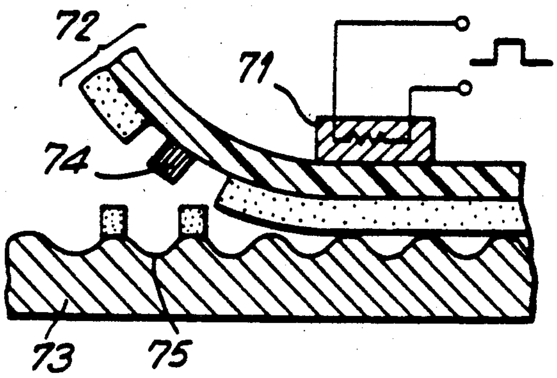
FIG. 16
PRIOR ART

FIG. 17A
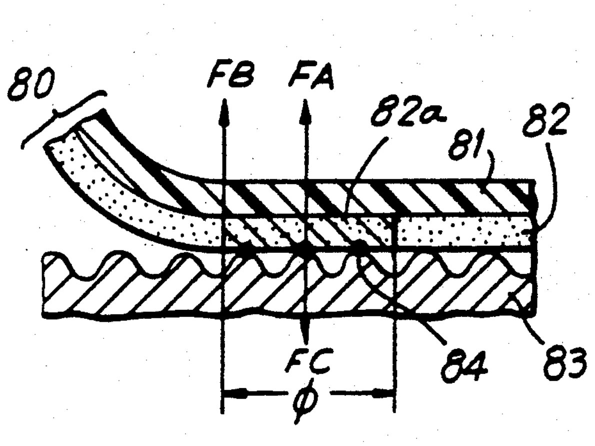
FIG. 17B
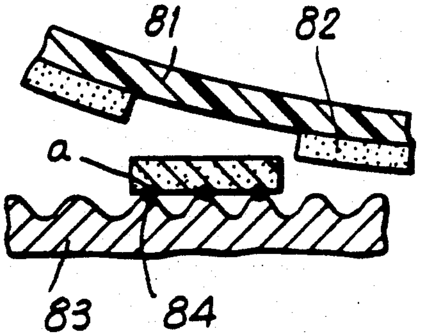
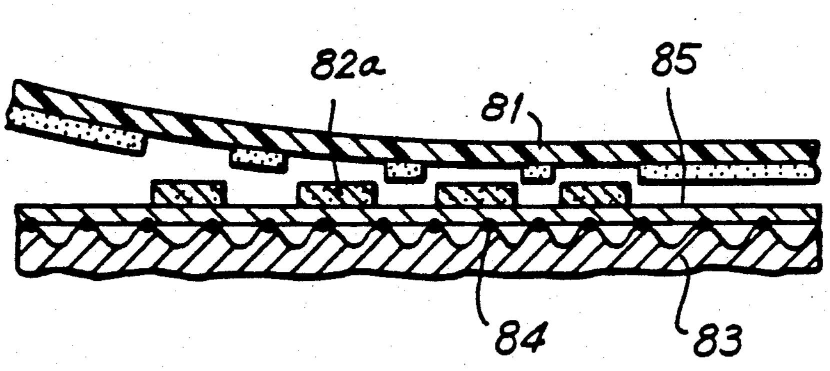
FIG. 17C

THERMAL TRANSFER INK PRINTING APPARATUS

This is a divisional application of application Ser. No. 07/104,139, filed Oct. 5, 1987 U.S. Pat. No. 4,914,079.

BACKGROUND OF THE INVENTION

This invention relates generally to thermal transfer ink media which are used to form images by application of thermal energy and, in particular, to a thermal transfer ink medium suitable for transferring printed images onto rough or uneven surfaces and to a method of thermal printing wherein an ink transfer layer and ink are transferred to a transfer medium.

A variety of compact, low cost thermal transfer printing apparatus that use thermal transfer ink media to form images on transfer media by application of thermal energy are available. As shown in FIG. 15, the thermal transfer ink media used in these apparatus generally include a heat-resistant support layer 61 having a thermoplastic ink layer 62 disposed thereon. Thermoplastic ink layer 62 includes at least a thermoplastic material and a coloring material. Thermal energy is applied to support layer 61 from the side opposite ink layer 62 causing a portion of ink layer 62 to melt and transfer to a transfer medium such as paper.

The coloring materials used in thermoplastic ink layer 62 can include pigments, dyes and the like. Some thermoplastic ink layers exhibit adhesive properties when melted and thermal transfer ink media having this type of ink layer are referred to as "thermal melt transfer ink media". Alternatively, the thermoplastic ink layers can include sublimatable dyes which form images by chemical attachment to a transfer media and ink media with this type of ink layer are referred to as "thermal sublimation transfer ink media".

Prior art thermal transfer printing methods generally are not suitable for providing round printed dots or exhibiting good print quality when rough paper, paper with low chemical affinity for the ink or a film is used as the transfer medium. This is due to the fact that the ink from the thermal transfer ink medium is only transferred to the transfer medium at portions where the ink layer of the ink medium is in contact with the transfer medium. No ink is transferred at valley portions of the transfer medium where the ink layer is not in contact with the transfer medium, even if sufficient thermal energy has been applied to the ink layer at that portion. This phenomenon is shown in FIG. 16 wherein an ink layer 74 of a thermal transfer ink medium 72 is not transferred to a transfer medium 73 at a valley portion 75 of transfer medium 73. This occurs even though ink layer 74 has been heated and melted by thermal energy from a thermal head 71 in the portion opposite valley portion 75. The amount of ink transferred is especially small when high resolution dots are transferred.

Sublimation transfer printing is slightly different in that the transfer paper has a developing layer with a chemical affinity for the sublimation colorant. Sublimation transfer paper can also be the cause of difficulties if it has a rough surface since insufficient dye will be transferrd for the color to develop properly. The problems associated with effective ink transfer increase in proportion to the desired transfer resolution.

When the transfer paper is formed of rough fibers, ink that is in contact with the transfer paper transfers as a result of surface adhesion even in non-printing portions.

This causes the transfer medium to smear and print stain to develop.

As shown in FIGS. 17A and 17B, three forces act on the ink during transfer from a thermal transfer ink medium 80 to a transfer medium 83 having a plurality of rough spots or points 84. A thermal transfer ink media 80 includes a support layer 81 with a thermal transfer ink layer 82. FA is the adhesive force exerted on ink layer 82 by support layer 81 of thermal transfer ink medium 80. FB is the cohesive force acting within ink layer 82 and FC is the adhesive force between ink layer 82 and transfer medium 83 at each contact point 84. Image transfer can be accomplished when:

$$FC > FA + FB$$

FA and FC are proportional to the area of the image to be transferred and can be expressed by the equations:

$$FA = fA \times S; \text{ and}$$

$$FC = fC \times S$$

wherein fA and fC are the adhesive transfer forces corresponding to FA and FC, respectively, per unit area and S is the area of the image. FB is proportional to the circle of the image when the thickness of the ink is uniform and is expressed by the equation:

$$FB = fB \times \lambda$$

wherein fB is the cohesive force of the ink per unit area and $\lambda$ is the length of the circle.

When an image is formed by circular dots and the image diameter is $\phi$, the forces acting on the transferred ink can be expressed by the following equations:

$$FA = K_1 \times fA \times \phi^2;$$

$$FB = K_2 \times fB \times \phi; \text{ and}$$

$$FC K_3 \times fC \times \phi^2$$

wherein $K_1$, $K_2$ and $K_3$ are constant. The inequality that must be satisfied in order to transfer an image can be expressed as;

$$K_3 \times fC \times \phi^2 > K_1 \times fA \times \phi^2 + K_2 \times fB \times \phi,$$

which is equivalent to:

$$K_3 \times fC > K_1 \times fA + K_2 \times fB/\phi$$

The value of fC decreases when the transfer medium has a rough surface. Furthermore, $\phi$ decreases and $1/\phi$ increases when the transfer image area is small. Thus, transfer efficiency is especially poor when the transfer medium has a rough surface and the transfer image area is small.

Accordingly, it is desirable to provide an improved thermal transfer ink medium that overcomes the deficiencies of prior art thermal transfer ink media when small ink dots are transferred onto rough surfaces.

SUMMARY OF THE INVENTION

Generally speaking, in accordance with the invention, a thermal transfer ink medium including a heat resistant support layer with a heat activatable ink layer disposed thereon and an ink transfer layer or film on the ink layer is provided. Printing is performed by applying thermal energy to selected portions of the support layer side of the thermal transfer ink medium in accordance with image signals representative of numbers, characters and graphic print images. During printing using the thermal transfer ink media prepared in accordance with the invention, the ink transfer layer is transferred onto a transfer medium and portions of the ink are transferred to the transfer layer by selective activation of the ink layer Transfer may be in a two step process or the image may be thermally transferred to the transfer layer by application of heat at the platen position. By providing the ink transfer layer, the ink is maintained as a cohesive body and transfer is not affected by the surface roughness of the transfer medium.

Accordingly, it is an object of the invention to provide an improved thermal transfer ink medium.

Another object of the invention is to provide an improved thermal transfer medium which provides formation of high resolution printed characters.

Another object of the invention is to provide an improved thermal transfer ink medium that provides high quality print on paper having a rough surface.

A further object of the invention is to provide an improved thermal transfer ink medium that provides high quality print on paper having a low chemical affinity for the ink.

Still another object of the invention is to provide an improved thermal transfer ink medium which prevents print stain on the transfer medium.

Still a further object of the invention is to provide an improved printing method using a thermal transfer ink medium having an ink transfer layer in addition to the ink layer.

Still other objects and advantages of the invention will in part be obvious and will in part be apparent from the specification.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a cross-sectional view of a thermal transfer ink medium constructed and arranged in accordance with the invention;

FIG. 2 is a cross-sectional view of a thermal transfer ink medium constructed and arranged in accordance with an alternate embodiment of the invention;

FIG. 3 is a cross-sectional view of a thermal transfer ink medium constructed and arranged in accordance with a further embodiment of the invention;

FIG. 4 is a partially cut away perspective view of the thermal transfer ink medium of FIG. 1 wound around a center core;

FIG. 5 is a cross-sectional view of a thermal transfer ink medium constructed and arranged in accordance with another embodiment of the invention;

FIGS. 9A and 9B are diagramatic views illustrating the steps in a method of printing wherein the thermal transfer ink is selectively transferred with a thermal transfer layer in a two step printing process using the thermal ink media of FIG. 1 in accordance with the invention;

FIG. 10 is a diagramatic view illustrating thermal transfer printing with transfer of the image at the platen in accordance with the invention;

FIGS. 12 is a diagramatic view showing the two step process of printing using a sublimating thermal transfer ink media in accordance with the invention;

FIG. 13 is a diagramatic view illustrating printing using a sublimating thermal transfer ink media with transfer of the thermal image at the platen in accordance with the invention:

FIGS. 14A, 14B and 14C are diagramatic views illustrating yet a further method of printing in accordance with the invention;

FIG. 15 is a cross-sectional view of a prior art thermal transfer ink medium;

FIG. 16 is a diagramatic view showing a method of printing using a prior art thermal transfer ink medium; and FIGS. 17A, 17B and 17C are cross-sectional views illustrating the forces acting on ink at the time it is removed from a thermal transfer ink medium.

DESCRIPTION OF THE PREFERRED EMBODIMENTS

Figure 6:
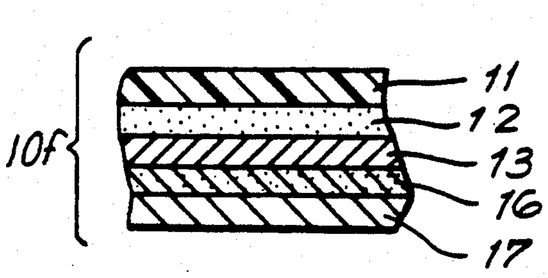
FIG. 6 is a cross-sectional view of a thermal transfer ink medium constructed and arranged in accordance with yet another embodiment of the invention.

Thermal transfer ink media prepared in accordance with the invention includes a heat resistant support layer having at least a thermally sensitive ink layer thereon and an ink transfer layer disposed on the ink layer. The ink transfer layer is transferred to a transfer medium. The ink is selectively transferred to the transfer layer during printing. The ink transfer media provided are especially useful for transferring ink onto a transfer medium that has a rough surface.

Ink transfer printing is performed by making the surface of the ink transfer medium uniform and correspond to at least the level of the ink layer carried on the support. Upon application of heat in accordance with image signals, the ink adheres to the ink transfer layer and is deposited with the ink transfer layer on the surface of the paper. This makes it possible to provide high quality transfer printing on a rough paper 83 as shown in FIGS. 17A and 17B. An ink transfer layer 85 on which an image 82*a* is formed is transferred to transfer paper 83 as a cohesive body as shown in FIG. 17C. Therefore the value of $1/\phi$ decreases and transfer efficiency increases.

Heat-resistant support laYer 11 is formed of condenser paper or a heat-resistant polymer film, such as polyethylene terephthalate (PET), polyether sulfone (PES), polyetherether ketone (PEEK), polyphenylene sulfide (PPS), polyimide and polyimide imide to a thickness of between about 1 and 20 μm.

The thermoplastic ink layer is formed of a thermoplastic material with dyes or pigments dispersed therein and has a melting or softening point between about 40° and 200° C. The thermoplastic material is a binder formed of wax such as natural wax, oil wax, compound wax, fatty amides, fatty esters, ethylene vinyl acetate (EVA), ethylene ethyl acetate (EEA), polyvinyl alcohol, methyl cellulose, carboxymethyl cellulose, styrene-butadiene copolymers, methylmethacrylic resin and the like. The thermoplastic ink layer preferably contains between about 50 and 99% by weight of thermoplastic material and between about 1 and 50% by weight of dye or pigment. When the ink layer contains a sublimatable dye, oily polymers such as phenol, rosin, polyamide and alkylcellulose or aqueous polymers such as acrylic acid and maleic acid can be used as binders and such ink layers have between about 0.5 and 50% by weight thickness between about 0.1 and 20$\mu$m.

The ink transfer layer is a thin transparent film or thin colored film and primarily includes a thermoplastic organic material or cross-linking type organic material. The ink can contain wax or polymers or mixtures of wax and polymers and preferably has good affinity for the dye, the pigment and the binder. However, since the ink transfer layer must be removed from the ink layer as a film at room temperature, the ink layer and ink transfer layer should not have too high an affinity for each other at the interface. Specifically, it is necessary to expand and bring the dye or ink into contact with the ink transfer laYer at the portion at which thermal energy is applied and it is necessary to prevent the dye or ink from being expanded and transferred at the portion at which thermal energy is not applied. A release layer can be provided on contacting surfaces between the ink layer and the ink transfer layer. Additionally, the process of forming the ink layer can be different than that of forming the ink transfer layer.

An adhesive layer can be provided on the outer surface of the transfer layer and is formed of a thermoplastic material that is tacky at ambient temperatures. The adhesive layer can be formed of the same compounds as those included in the ink layer and the ink transfer layer. In addition, the adhesive layer preferably includes a mixture of natural rubber, styrene butadiene rubber (SBR), polyvinyl ether, polyacrylic ester and the like with tacky resins such as polyterpene, rosin, oil, hydrocarbons and the like. A film of paper formed of silicon or fluorine compounds can be used as the release layer when a low surface tension treatment is performed on the surface.

The invention will be better understood with reference to the following Examples. These Examples are presented for purposes of illustration only and are not to be construed in a limiting sense.

EXAMPLE 1

FIG. 1 shows a thermal transfer medium 10 constructed and arranged in accordance with the invention. Thermal transfer ink medium 10 includes a heat-resistant support layer 11 with an ink layer 12 disposed thereon. An ink transfer layer 13 is coated on ink layer 12.

Heat-resistant support layer 11 was formed of polyethylene terephthalate (PET) and had a thickness of 4 $\mu$m. Ink layer 12 had the composition:

| | |
|---|---|
| Paraffin wax | 50% by weight |

-continued

| | |
|---|---|
| Carnauba wax | 25% by weight |
| Ethylene vinyl acetate copolymer (EVA) | 8% by weight |
| Ethylene ethyl acetate copolymer (EEA) | 7% by weight |
| Carbon black | 10% by weight |

Ink layer 12 was coated on heat-resistant support layer 11 using a hot melt process to a thickness of 3 $\mu$m. Ink transfer layer 13 was formed by coating an aqueous acrylic emulsion having an average particle diameter of 0.5$\mu$m on ink layer 12 and drying the coated acrylic emulsion. The coated acrylic emulsion had a thickness of 10 um. Thermal transfer ink medium 10 was rolled around a core 17 for purposes of storage as shown in FIG. 1D.

FIGS. 9A and 9B illustrate a method of printing using ink transfer medium 10 of FIG. 1. Ink 12 disposed on support 11 is melted at the portions designated by reference letter S by thermal energy applied from a thermal head 21. Ink portions 12*a* opposite a platen 23 are adhered to ink transfer laYer 13 to form an image. Thermal transfer ink medium 10 and transfer medium 22 are pressed together above a second platen roller 25. Heat-resistant support layer 11 and unmelted portion S of ink layer 12 separate from ink transfer layer 13 in the melted portions of ink layer 12 which are transferred with ink transfer layer 13 to transfer medium 22 as transferred ink portions 12*a*. At the same time, ink transfer layer 13 is brought into contact with the Sa portion of transfer medium 22 which adheres due to heat and pressure applied by a roller 24. Support layer 11 with unused ink layer 12 is moved upward about roller 24 and ink transfer layer 13 is moved downward with transfer medium 22 about second roller 25 as shown in FIG. 9A.

In one embodiment, ink transfer laYer 13 is formed of pressure-sensitive adhesive so that it can be transferred to transfer medium 22 by pressure. Alternatively, ink transfer layer 13 can be formed of a thermoplastic material and is transferred by softening or melting ink transfer layer 13 using heat. Thermal transfer printing can be accomplished when:

$$TA > TB > TC$$

wherein TA represents the temperature of the ink transferred to ink transfer layer 13, TB represents the temperature of roller 24 and TC represents the temperature at the interface between transfer medium 22 and ink transfer layer 13. Consequently, ink 12 in portions where no thermal energy is applied is not transferred to ink transfer layer 13.

After ink transfer layer 13 is adhered to transfer medium 22, travel of thermal transfer ink medium 10 across platen 23 is stopped and transfer medium 22 continues to be fed. At this time, ink transfer layer 13 is cut away from support layer 11 at the portion indicated by a letter P.

In the embodiment shown in FIGS. 9A and 9B the steps of transferring portions 12*a* of ink layer 12 to ink transfer layer 13 and of adhering the ink transfer layer 13 with the image to transfer medium 22 are performed sequentially. In an alternate embodiment, these steps can be performed simultaneously as illustrated in the embodiment of FIG. 10. The thermal image formed by ink portions 12*a* are transferred by thermal head 21 at the same time that ink transfer layer 13 is in fixed contact with transfer medium 22 at platen 23. Ink transfer layer 13 is maintained in fixed contact with transfer medium 22 as a result of pressure from thermal head 21, thermal bias at or below the ink transfer temperature or heating of platen 23 or a combination of these.

In order to prevent the ink from blocking on ink transfer layer 13 during the time ink transfer layer 13 is in fixed contact with thermal head 21, a thin release layer 14 can be provided at the interface between ink 12 and ink transfer layer 13 as shown in transfer media 10*a* in FIG. 2. Since release layer 14 and transfer layer 13 are very thin, they melt and expand without preventing ink 12 from transferring to ink transfer layer 13. When printing is performed using thermal transfer ink media 10*a* of the type shown in FIG. 2 and a media 10C in FIG. 3, dots of particularly high transfer efficiency are printed.

EXAMPLE 2

Thermal transfer ink medium 10 of this Example includes surface treatment layer 14 or a release layer 15 on ink layer 12 as shown in FIGS. 2 and 3, respectively. Heat-resistant support layer 11 and ink layer 12 of the type described in Example 1 are used. Surface treatment layer or release layer 14 has a thickness of about 0.1 μm and is prepared by coating a silicon surface active agent on the ink layer using a solvent. Ink transfer layer 13 is about 20 um this and is formed of ethylene vinyl acetate copolymer (EVA) obtained by laminating an EVA film on release layer 14 at ambient temperature and atmospheric conditions. When printing was performed using the process described in Example 1, dots of particularly high transfer efficiency and quality were printed.

Release layer 15 has the composition:

| | |
|---|---|
| Paraffin wax | 90% by weight |
| EVA | 10% by weight |

Release layer 15 is prepared by coating approximately 1.0 g/m$^2$ of this composition on ink layer 12 using a hot melt gravure process so that release layer 15 has a rough surface. Ink transfer layer 13 is deposited by coating an aqueous vinyl acetate emulsion on release layer 15 and drying the coated material. Ink transfer layer 13 has a thickness of about 6 μm. When printing was performed as described in Example 1, dots of particularly high quality were printed. The rolled thermal transfer ink medium could be maintained at temperatures up to about 60° C. or greater. This represents an improvement on the maintenance temperature of prior art thermal ink transfer media which is about 40° C.

EXAMPLE 3

Figure 11A:
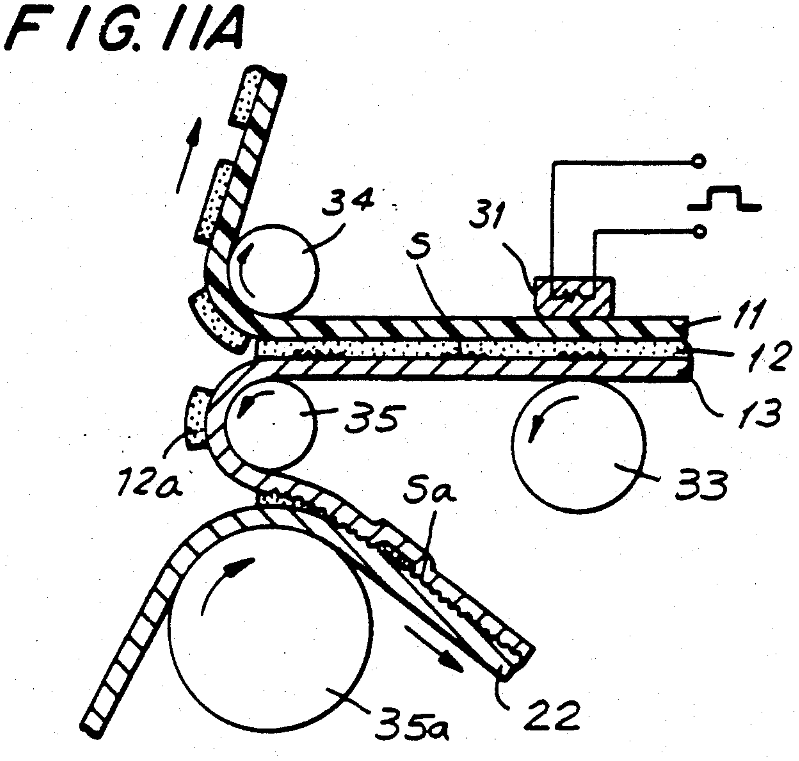
FIGS. 11A and 11B are diagramatic views showing the steps in an alternate method of thermal transfer printing using thermal transfer ink media in accordance with the invention.
Figure 11B:
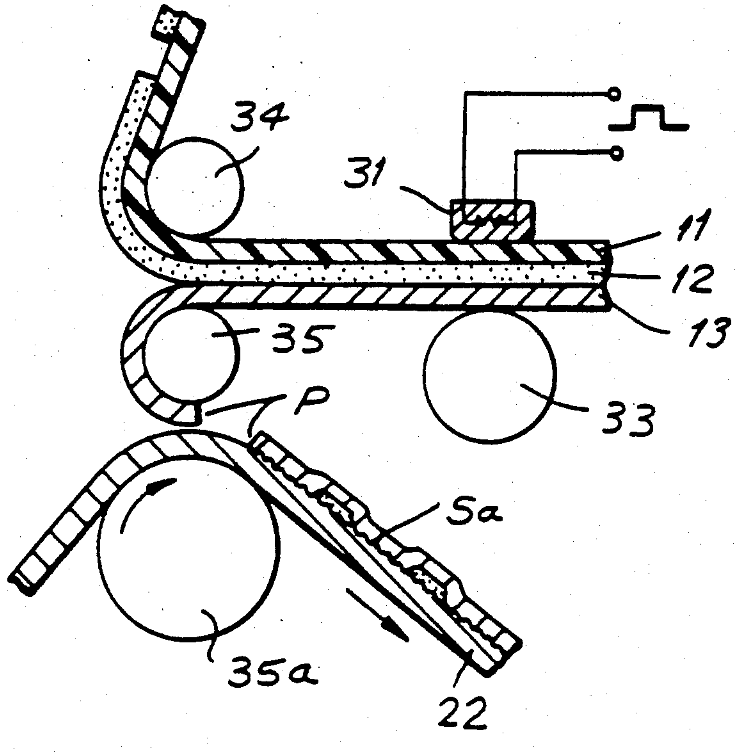

In this example, thermal transfer ink medium 10 of the type described in Example 1 was used and was transferred by the process depicted in FIGS. 11A and 11B. As shown in Step 1 in FIG. 11A, ink layer 12 is selectively melted by heat energy from a thermal head 31 opposite a platen 33 in accordance with image signals and is adhered to ink transfer layer 13 at transfer portions designated by the reference letter S.

In Step 2, ink 12 that is adhered to ink transfer layer 13 at ink transfer portions S is transferred with ink transfer layer 13 by separating heat-resistant support layer 11 and unmelted portions of ink layer 12 from ink transfer layer 13. Ink transfer layer 13 is separated from support layer 11 by a first transfer roller 34 and a second transfer roller 35. This removes ink portions 12*a* corresponding to the image to be printed on transfer medium 22 for transferring ink in order to bring a transferred ink portion 12*a* into fixed contact with ink transfer layer 13.

In Step 3, depicted in FIG. 11B, ink transfer layer 13 is brought into fixed contact with transfer medium 22 using transfer roller 35 and platen roller 35*a*. Ink can be brought into fixed contact with transfer medium 22 by application of pressure between transfer roller 35 and platen roller 35*a* or by heating transfer roller 35 and activating transfer layer 13 using heat. When ink transfer layer 13 is transferred using pressure, it is formed of a pressure-sensitive material. Alternatively, ink transfer layer 13 is formed of a thermoplastic material when it is to be softened or melted using heat.

When heat is used, thermal transfer printing is accomplished when:

$$TA > TB > TC$$

wherein TA represents the temperature of ink 12*a* transferred to ink transfer layer 13, TB represents the temperature of roller 34 and TC represents the temperature at the interface between transfer medium 22 and ink transfer layer 13. Ink in portions wherein the thermal image is not applied is not transferred to the ink transfer layer.

FIG. 11B shows complete transfer of ink transfer layer 13 and transferred ink 12 to a transfer medium 22. When transfer is complete, heat-resistant support layer 11 and ink transfer layer 13 are stopped and only transfer medium 22 is moved. Alternatively, heat-resistant support layer 11 and ink transfer layer 13 may be moved and transfer medium 27 may be stopped. Ink transfer layer 13 is cut away at the portions designated by reference letter P. In this embodiment, ink portions 12*a* contact transfer medium directly and transfer layer 13 forms a protective coating over transferred ink portions 12*a*.

EXAMPLE 4

FIG. 5 shows a sectional view of thermal transfer ink medium 10*e*. Heat-resistant support layer 11 is formed of PET having a thickness of about 6 μm. Ink layer 12 is prepared by coating and drying a composition of phenol resin and anthraquinone sublimation pigment using a solvent process to a dried thickness of 2 μm. Ink transfer layer 13 is PET formed by depositing a solvent and drying to a film thickness between about 1 and 5 μm. Adhesive layer 16 is deposited by coating and drying an aqueous emulsion of polyacrylic ester on the ink transfer layer to a thickness of 4 μm.

Referring to FIGS. 12 and 13 printing is performed as follows. In Step 1, a sublimation transfer ink 12' is transferred to ink transfer layer 13 by heat energy from a thermal head 41 above a platen 42. Images are formed at the portions indicated by image signals A.

In Step 2, ink transfer layer 13 on which image A is formed is brought into direct contact with transfer medium 22. As shown in the embodiment of FIG. 12, heat-resistant support layer 11 and ink layer 12' are separated from ink transfer layer 13, transferred ink image A and adhesive layer 16 at the same time that ink transfer layer 13 and adhesive layer 16 are brought into fixed contact with transfer medium 22 by heat or pressure from a platen roller 42*a*. Separated ink transfer layer 13 is transported away from support layer 11 by travel about a second platen roller 42*b*.

The processes of Step 1 of transferring ink 12 to ink transfer layer 13 and Step 2 of bringing ink transfer layer 13 into fixed contact with transfer medium 22 may be performed sequentially or simultaneously. As shown in FIG. 13, the thermal image can be transferred by heat from thermal head 41 above platen 42 at the same time that ink transfer layer 13 and adhesive layer 16 are brought into contact with transfer medium 22. Ink transfer layer 13 can be brought into fixed contact with transfer medium 22 as a result of pressure from the thermal head, thermal bias which occurs at or below the ink transfer temperature, heating of the platen or a combination of these effects.

Heat-resistant support layer 11 is PET having a thickness of 6 μm. Ink layer 12' had the following composition:

| | |
|---|---|
| Microcrystalline wax | 40% by weight |
| Magnetized wax | 20% by weight |
| Polyethylene | 20% by weight |
| EVA | 10% by weight |
| Dispersant | 10% by weight |

The ink composition was coated on heat-resistant support layer 11 to a thickness of 3.5 um by a hot melt coating process. A silicon acrylic emulsion having a thickness of 3 um was coated and dried on the ink layer. The adhesive layer was a copolymer of aqueous acrylic amide formed by an emulsion coating process to a thickness of 8 um.

EXAMPLE 5

Figure 7:
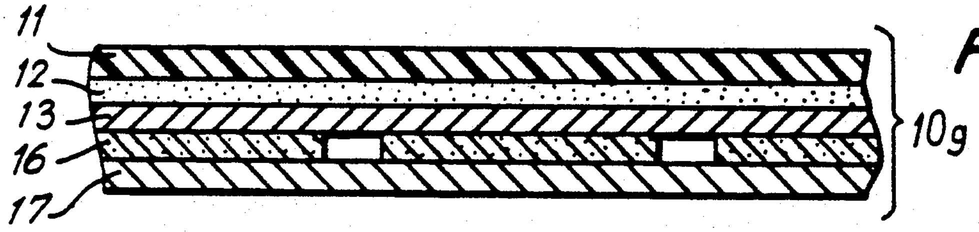
FIG. 7 is a cross-sectional view of a thermal transfer ink medium constructed and arranged in accordance with yet a further embodiment of the invention.

FIGS. 6 and 7 show sectional views of the thermal transfer ink media 10*f* and 10*g* used in this Example. PET heat-resistant support layer 11 having a thickness of 4 μm was used and an ink layer of the following composition was coated thereon:

| | |
|---|---|
| Paraffin wax | 45% by weight |
| Maleic anhydride copolymer | 20% by weight |
| Carnauba wax | 20% by weight |
| EEA | 5% by weight |
| Carbon black | 10% by weight |

Ink layer 12 was formed by hot melt coating to a thickness of 2.5 um.

Ink transfer layer 13 having a thickness of 3.5 um was formed by coating an aqueous styrene acrylic emulsion on ink layer at ambient temperature and drying at approximately 50° C. Adhesive layer 16 having a thickness of 7 um was formed by coating the aqueous acrylic acetate ester emulsion on ink transfer layer 13. A release layer 17 was formed by depositing a nylon film on adhesive layer 16 and was obtained by coating and drying the silicon of release layer 17 using a solvent process. As shown in FIG. 7, adhesive layer 16 was coated intermittently on ink transfer layer 13 and need not be continuous.

Thermal transfer ink medium 10 can be rolled around a core 18 as shown in FIG. 4. Printing and labeling were performed using the process depicted in FIGS. 14A to 14C. A thermal transfer ink medium 50 includes heat-resistant support layer 11, ink layer 12, ink transfer layer 13, adhesive layer 16 and release layer 17 as shown in FIG. 14A. A thermal head 51 permits ink layer 12 to adhere to ink transfer layer 13 by application of heat to form latent images Sa. Transfer ink medium 50 is then cut away using a cutter 52 in portions corresponding to the latent images.

As shown in FIG. 14B, release layer 17 is removed from transfer ink medium 50. Then adhesive layer 16 is contacted with transfer medium 22. Support layer 11 and ink layer 12 are removed as shown in FIG. 14C and ink portions 12*a* corresponding to the image are transferred to ink transfer layer 13. The image is of extremely high quality, had excellent adhesive properties with the transfer medium and the transfer efficiency of the ink was high.

Figure 8:
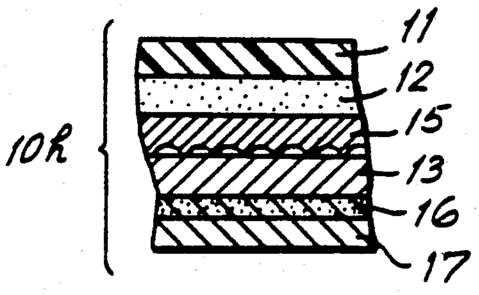
FIG. 8 is a cross-sectional view of a thermal transfer ink medium constructed and arranged in accordance with still another embodiment of the invention.

Excellent transfer printing was also performed when a thermal transfer ink medium 10*h* shown in FIG. 8 was used. Heatresistant support layer 11 and ink layer 12 were the same as those described. Release layer 15 was formed of a thermoplastic material of the composition described and had a thickness of 1.5 g/m$^2$ Release layer 15 was coated on ink layer 12 using a hot melt gravure process to provide a rough surface.

Ink transfer layer 13 had a thickness of 1 μm and was formed by coating an ultraviolet curing acrylic emulsion, irradiating it using ultraviolet light and cross-linking the acrylic emulsion. Adhesive layer 16 had a thickness of 1 μm and was formed by coating a resin derivative on ink transfer layer 13 using a solvent process and drying the coated resin derivative. The coating was formed by a gravure process in order to provide a rough surface. Release layer 15 was formed by coating a fluorine surface activator on the surface of condenser paper to a thickness of 10 μm and depositing a coated material on adhesive layer 16 in order to provide a layer having a low surface tension.

Each of the ink transfer media had a high transfer efficiency and exhibited high quality printing when release layer 15 and surface treatment layer 14 were of the type shown in FIGS. 1–8.

The thermal transfer ink media prepared in accordance with the invention includes a heat resistant support layer with an ink layer and a covering ink transfer layer that is releasable as a film. When thermal transfer printing is performed using these ink media, the recording portion of the ink is accurately transferred to the transfer medium. The ink and transfer medium do not adhere to each other at non-recording portions. Even when the paper has a rough surface, the ink transfer layer having a comparatively large area is compressed against the paper as a cohesive body so that it is possible to omit the prior art processes of tearing off the ink media to improve the transfer efficiency of the ink. High quality character and graphic images can be reproduced even on paper that is inferior in surface smoothness, has a low affinity for the ink and the like. In addition, the ink transfer layer provides excellent adhering characteristics of characters and graphic images provided on a wide variety of transfer media.

It will thus be seen that the objects set forth above, among those made apparent from the preceding description, are efficiently attained and, since certain changes may be made in carrying out the above methods and in the articles set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A thermal transfer printing apparatus adapted for forming an image on a recording medium with a thermal transfer ink medium having at least a heat resistant support layer, a thermal ink layer thereon and an ink transfer layer on the ink layer, comprising:

a thermal print head for selectively applying thermal energy to the thermal transfer ink medium in a selected pattern corresponding to a desired image;

first platen means disposed opposite to the print head with the thermal transfer ink medium and not the recording medium therebetween for cooperating with the print head for contacting the thermal transfer ink medium to the print head for transferring the thermal energy from the printing head to selectively heat the ink layer for transfer of selected portions of the ink layer to the ink transfer layer; and second platen means for contacting the ink transfer layer leaving a position between the print head and the first platen means to the recording medium and for separating the support layer and unselected ink portions from the ink transfer layer and selected ink portions and for adhering the ink transfer layer and selected ink portions to the recording medium.

2. The apparatus of claim 1, wherein the second platen means includes a pair of cooperating second and third platen rollers positioned to permit the thermal transfer ink medium moving from a position between the first platen means and the print head to contact the recording medium to adhere the ink transfer layer in the form o a continuous sheet to the recording medium in at least regions of the image, the second and third platen rollers positioned so that the support layer and unselected portions of the ink layer can be drawn about the second platen roller to separate the support layer from the ink transfer layer and image and adhere the ink transfer layer to the recording medium which can be drawn about the third platen roller away from the support layer.

3. The apparatus of claim 2, wherein at least one of the second and third platen rollers includes means for applying at least one of heat and pressure to adhere the ink transfer layer and selected ink portions to the recording medium.

4. The apparatus of claim 1, wherein the second platen means includes a pair of cooperating second and third platen rollers positioned to engage the thermal transfer ink medium so that the support layer and unselected ink will be drawn about the second roller to separate the support layer and unselected ink from the ink transfer layer and selected ink which will be drawn about the third platen roller, and the second platen means also includes a fourth platen roller in cooperation with the third roller with the recording medium advancing thereabout, the ink transfer layer and selected ink contacted against the recording medium between the third and fourth rollers for transferring the image and ink transfer layer to the recording medium.

5. The apparatus of claim 4, wherein at least one of the third and fourth rollers includes means for applying at least one of heat and pressure for adhering the ink transfer layer and selected ink layer portions to the recording medium.

6. The apparatus of claim 1, wherein the second platen means includes roller means for applying at least one of heat and pressure to adhere the ink transfer layer to the recording medium.

* * * * *